Feb. 17, 1970       W. B. GOGARTY       3,495,661
INCREASING THE PRODUCTIVITY OF GAS-DRIVEN RESERVOIRS
Filed July 25, 1968
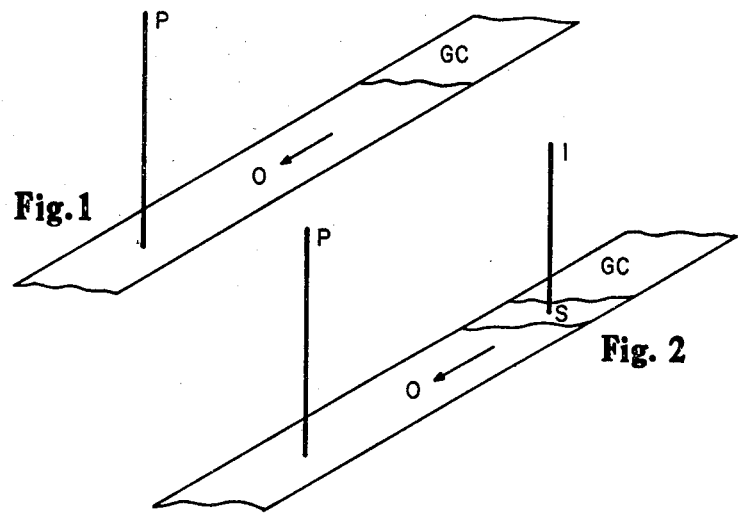
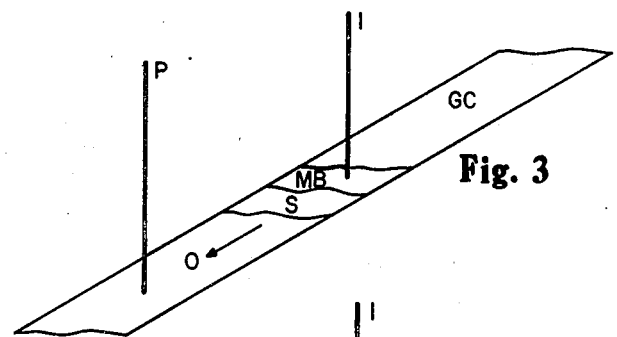
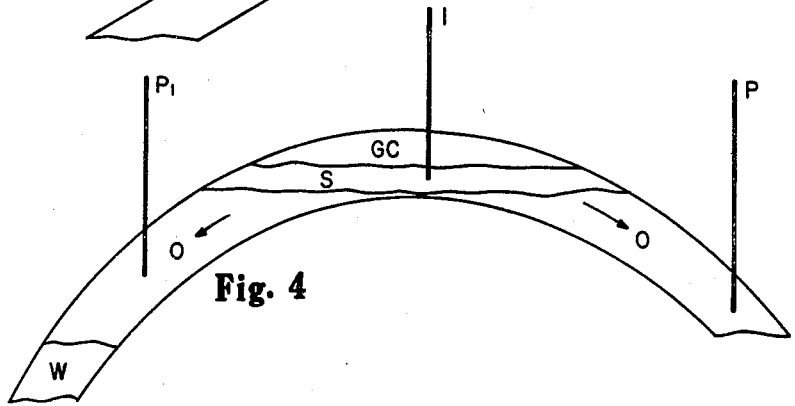
*INVENTOR*
WILLIAM B. GOGARTY
BY
*ATTORNEY*

United States Patent Office 3,495,661
Patented Feb. 17, 1970

3,495,661
INCREASING THE PRODUCTIVITY OF GAS-DRIVEN RESERVOIRS
William B. Gogarty, Littleton, Colo., assignor to Marathon Oil Company, Findlay, Ohio, a corporation of Ohio
Filed July 25, 1968, Ser. No. 747,738
Int. Cl. E21b 43/22
U.S. Cl. 166—274                                14 Claims

ABSTRACT OF THE DISCLOSURE

Production of formation fluids from an oil-bearing permeable subterranean formation characterized as having a gas cap as the primary moving force of the formation fluids is improved by injecting a micellar dispersion at the juncture of the formation fluids and the fluid in the gas cap. Optionally, a mobility buffer can be injected behind the micellar dispersion.

BACKGROUND OF THE INVENTION

Micellar dispersions are useful in secondary-type recovery processes (especially tertiary recovery) for recovering oil in a subterranean formation. This is usually effected by injecting a micellar dispersion into the formation and displacing it by a water drive towards at least one production means and recovering crude oil therefrom. Recovery of up to about 100% of the oil in place can be realized from such a process. Examples of such systems are defined in U.S. Patents Nos. 3,275,075 and 3,254,714 to Gogarty et al.

Applicant has discovered that production from a subterranean formation characterized as having a gas cap as the primary moving force can be improved by injecting a micellar dispersion (and optionally a mobility buffer) at the juncture of the formation fluids and the gas cap fluid. Preferably, the micellar dispersion is characterized as having a specific gravity between that of the formation fluids and that of the fluid in the gas cap. The term "formation fluids" as used herein, defines the combination of crude oil plus interstitial water within the formation. Recovery of the crude oil is the ultimate purpose of this invention but it is recognized that some interstitial water will be recovered along with the crude oil. Therefore, wherever crude oil is used, it is meant to include interstitial water.

DESCRIPTION OF THE DRAWINGS

FIGURE 1 represents a cross section of a formation having GC (gas cap) naturally displacing O (crude oil) towards P (production means). Within these figures, the term crude oil is meant to be synonymous with formation fluids.

FIGURE 2 represents the same formation having I (injection means) in fluid communication with the formation and S (a micellar dispersion slug) at the juncture of GC and O.

FIGURE 3 is similar to FIGURE 2 except MB (a mobility buffer fluid) is injected after S. Preferably S has a specific gravity between that of the specific gravity of O and that of GC and MB has a specific gravity between that of S and GC.

FIGURE 4 represents a cross section of an anticline formation with a GC primary moving force to displace S and O towards production means $P_1$ and P. $P_1$ has W (water zone, aquifer, down-dip of the formation), however GC is the primary moving force of the formation. The W can aid in the displacement of O towards production means but GC is the primary moving force.

DESCRIPTION OF THE INVENTION

The oil-bearing formations useful with this invention are those having a gas cap as the primary moving force to displace formation fluids toward a production means in fluid communication with the formation. The term gas cap as used herein is meant to include gas caps obtained by natural or artificial means (e.g. gas caps wherein pressure is maintained by injecting gas from the surface). Gas cap defines a fluid zone above an oil zone within the formation which forces the oil into a production means.

Preferably, the reservoir conditions are such that the fluid within the gas cap acts as if it were miscible with the back portion of the micellar dispersion slug or the back portion of the mobility buffer when the latter is used. The fluid within the gas cap can be in the critical state, i.e. the pressure and temperature exceed the critical pressure and critical temperature.

The oil-bearing formation should be permeable to formation fluids, micellar dispersions, and the fluid within the gas cap. One or more production means can be drilled into the formation to produce the formation fluids. Also, one or more injection means can be drilled into the formation to obtain fluid communication therewith. Typical reservoirs useful with this invention include any reservoir wherein the oil-bearing formation has as the primary moving force a gas cap. That is, the gas cap will be the primary drive means of producing formation fluids from the formation, but other drive means can be characteristic of the formation to act as secondary drive means, e.g. an aquifer.

The term "micellar dispersion" as used herein is meant to include micellar solutions, microemulsions, "transparent" emulsions (Blair, Jr. et al. U.S. Patent No. 2,356,205), and micellar dispersion technology taught by C. G. Sumner, Clayton's, The Theory of Emulsions and Their Technical Treatment, fifth edition, pp. 315–320 (1954). Examples of micellar solutions are taught in U.S. Patents Nos. 3,254,714; 3,275,075; 3,301,325; 3,307,628; and 3,330,344. Micellar dispersions differ from emulsions in many ways, the strongest differentiation being that the former are thermodynamically stable and are generally transparent whereas the latter are not thermodynamically stable and are generally opaque.

The micellar dispersions of this invention can either be oil-external or water-external. Both types can act like they are miscible with the formation fluids.

The micellar dispersion is composed essentially of hydrocarbon, aqueous medium and surfactant sufficient to impart micellar characteristics to the dispersion. Preferably, cosurfactant and optionally electrolyte can be incorporated into the dispersion. Examples of volume amounts include from about 4% to about 60% or more of hydrocarbon, from less than about 20% to about 90% aqueous medium, at least about 4% surfactant, from about 0.01% to about 20% of cosurfactant and from about 0.001% to about 4% or more (weight percent based on aqueous medium) of electrolyte. From an economical basis, it is preferred that the micellar dispersion contain a large amount of water.

Examples of hydrocarbon include crude oil, partially refined fractions of crude oil and refined fractions thereof. Specific examples include side cuts from crude oil columns, crude column overheads, straight-run gasoline, and liquefied petroleum gases. Preferably, the hydrocarbon is crude oil or partially refined fraction of crude oil.

The aqueous medium can be soft water, brackish water or a brine water. Preferably, the water is soft but it can contain small amounts of salts which are characteristic of the subterranean formations being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monosterate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by Du Pont Chemical Corporation, Wilmington, Del.), Energetic W-100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.) and Arquad 12-50 (a 50% active dodecyl trimethyl ammonium chloride marketed by Armour Chemical Company, Chicago, Ill.), and like materials.

Preferably, the surfactant is a petroleum sulfonate, also known as alkyl aryl naphthenic sulfonate, and preferably containing a monovalent cation. Examples of preferred surfactants are the sodium and ammonium petroleum sulfonates having an average molecular weight of from about 350 to about 520, and more preferably from about 420 to about 470. The surfactant can be a mixture of low and high molecular weight sulfonates or a mixture of two or more different surfactants.

The cosurfactants (also known as semi-polar organic compounds and as cosolubilizers) useful with the invention include alcohols, amino compounds, esters, aldehydes and ketones containing from 1 up to about 20 or more carbn atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Concentrations of from about 0.01% to about 20% by volume of cosurfactant are useful in the micellar dispersion and more preferably from about 0.1 to about 5.0%. Mixtures of two or more cosurfactants are useful.

Examples of electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, and sodium nitrate. Examples of other useful electrolytes can be found in U.S. Patent No. 3,330,343. The type and concentration of electrolyte will depend on the aqueous medium, surfactant, cosurfactant, hydrocarbon and the reservoir temperature. Generally from about 0.001% to about 4% (weight percent based on aqueous medium) of electrolyte is useful. The electrolyte can be the salts within brackish or brine water.

The micellar dispersion preferably has a specific gravity between that of the formation fluids and that of the fluid within the gas cap. More preferably, the micellar dispersion can be characterized as having graded specific gravities from a high at the juncture of the micellar dispersion and formation fluids to a low at the juncture of the micellar dispersion and fluid within the gas cap.

When the mobility buffer is used, it is preferred that the mobility buffer has a specific gravity between that of the formation fluids and that of the fluid within the gas cap and more preferably between that of the micellar dispersion and that of the fluid within the gas cap. In addition, the mobility buffer can have graded specific gravities from a high at the juncture of the mobility buffer and micellar dispersion to a low at the juncture of the mobility buffer and the fluid within the gas cap.

The mobility of the micellar dispersion can be about equal to or less than that of the formation fluids. Such a mobility imparts a favorable flow characteristic to the process to protect against fingering or viscous instability. In addition, the mobility buffer can be characterized as having a mobility equal to or less than that of the formation fluids and more preferably equal to or less than that of the micellar dispersion. A portion of the mobility buffer or the micellar dispersion can contain mobilities graded from a low of that of the formation fluids to a high of that of the fluid within the gas cap. A favorable mobility condition is desired with the flooding process of this invention.

The mobility buffer is preferably compatible with the micellar dispersion and with the fluid within the gas cap. It can contain significant amounts of water or hydrocarbon. The purpose of the mobility buffer is to serve as a buffer between the micellar dispersion and the fluid within the gas cap, thus protecting the micellar dispersion from invasion by the fluid within the gas cap. The mobility buffer can be a lower molecular weight hydrocarbon, including alcohols, etc. containing from 1 to about 4 or more carbon atoms, an aqueous medium containing mobility-imparting agent, hydrocarbon containing mobility-imparting agent, or any fluid acting similar to these. Preferably, the mobility buffer acts like it is miscible with the micellar dispersion and fluid in the gas cap. Such a miscible like characteristic can be facilitated by increasing the pressure of the gas cap. The mobility imparting agents should be compatible with the particular medium in which it is contained, e.g. high molecular weight partially hydrolyzed polyacrylamides are useful in water and high molecular weight polyisobutylenes are useful in hydrocarbon.

Preferably, the formation fluids are produced at a rate such that the velocity of the fluids within the formation is below that of the critical velocity at which gravities of he formation fluids and the miscellar dispersion substantially integrate to cause fingering. That is, gravity segregation is preferably maintained throughout the process to protect against fingering. This gravity segregation phenomenon is discussed by R. J. Blackwell, J. R. Rayne, and W. M. Perry "Factors Influencing the Efficiency of Miscible Displacement," AIME Transactions, P.P. 8047, p. 6.

From about 1% to about 20% or more formation pore volume of the micellar dispersion is useful to effect efficient sweeping and improved crude oil recovery from the formation. More preferably, from about 2% to about 10% formation pore volume is useful. The micellar dispersion can be followed with from about 1% to about 75% formation pore volume of mobility buffer, more preferably from about 10% to about 50% is useful. When the difference between the mobilities of the formation fluids and the fluid in the gas cap is large, it is preferred to use larger amounts of mobility buffer, i.e. greater than about 10% formation pore volume.

After the micellar dispersion and optionally the mobility buffer is injected through injection means into the formation, the injection means is "shut-in" and the fluid within the gas cap is permitted to move the formation fluids through the formation to the production means. One or more injections means and one or more production means can be present within any particular formation. Also, the sequence of injection of the micellar dispersion and mobility buffer can be effected to improve recovery within a large formation.

It is intended that the invention not be limited by the specifics taught herein. Rather, it is intended that all equivalents obvious to those skilled within the art be included within the scope of this invention as described within the specification and appended claims.

What is claimed is:

1. A process of increasing the recovery of formation fluids from a permeable subterranean formation characterized as having at least one production means in fluid communication with at least one injection means and the primary moving force of the formation being a gas cap, the process comprising injecting into the formation at substantially the juncture of the formation fluids and the gas cap a small but sufficient amount of a micellar dispersion to increase the recovery of formation fluids from the formation and letting the fluid within the gas cap displace the formation fluids and the micellar dispersion toward the production means.

2. The process of claim 1 wherein the micellar dispersion is characterized as having a specific gravity between that of the formation fluids and the fluid within the gas cap.

3. The process of claim 1 wherein the micellar dispersion has a mobility about equal to or less than that of the formation fluids.

4. The process of claim 1 wherein the micellar dispersion is characterized as having an average mobility between that of the formation fluids and that of the fluid within the gas cap.

5. The process of claim 1 wherein a portion of the micellar dispersion is characterized as having graded mobilities from a low of about equal to or less than that of the formation fluids to a high of the fluid within the gas cap.

6. The process of claim 1 wherein a mobility buffer is injected into the formation after the micellar dispersion is injected therein.

7. The process of claim 6 wherein the mobility buffer has a mobility about equal to or less than that of the micellar dispersion.

8. The process of claim 6 wherein a portion of the mobility buffer is characterized as having graded mobilities from a low of about that of the micellar dispersion to a high of about that of the fluid within the gas cap.

9. The process of claim 6 wherein the pressure of the reservoir is such that the back portion of the mobility buffer and the front portion of the fluid in the gas cap act like they are miscible.

10. The process of claim 1 wherein the formation fluids are produced at a rate such that the velocity of the formation fluids is below that of the critical velocity at which gravities of the formation fluids and micellar dispersion substantially integrate to cause fingering.

11. The process of claim 1 wherein from about 1 to about 20% formation pore volume of the micellar dispersion is injected into the formation.

12. The process of claim 1 wherein a portion of the micellar dispersion is characterized as having a graded specific gravity zone from a high of the formation fluids to a low of the fluid within the gas cap.

13. The process of claim 1 wherein the pressure of the reservoir is such that the back portion of the micellar dispersion and the front portion of the fluid in the gas cap act like they are miscible.

14. The process of claim 1 wherein the pressure and temperature of the fluid within the gas cap exceed the critical pressure and critical temperature.

References Cited

UNITED STATES PATENTS

| | | | |
|---|---|---|---|
| 2,842,204 | 7/1958 | Horner | 166—268 |
| 2,885,003 | 5/1959 | Lindauer | 166—268 |
| 3,083,764 | 4/1963 | Gaskell et al. | 166—306 |
| 3,254,714 | 6/1966 | Gogarty et al. | 166—274 |
| 3,275,075 | 9/1966 | Gogarty et al. | 166—274 |
| 3,319,712 | 5/1967 | O'Brien | 166—273 X |
| 3,366,175 | 1/1968 | Ferrell et al. | 166—273 |
| 3,406,754 | 10/1968 | Gogarty | 166—273 |

STEPHEN J. NOVOSAD, Primary Examiner

U.S. Cl. X.R.

166—275